(12) United States Patent
Handa et al.

(10) Patent No.: US 6,182,785 B1
(45) Date of Patent: Feb. 6, 2001

(54) DUST COVER STRUCTURE FOR A POWER TRANSMISSION MEMBER

(75) Inventors: Akio Handa; Bunzo Seki; Atsuko Yamaguchi, all of Wako (JP)

(73) Assignee: Honda Giken Kogyo Kabushiki Kaisha, Tokyo (JP)

( * ) Notice: Under 35 U.S.C. 154(b), the term of this patent shall be extended for 0 days.

(21) Appl. No.: 09/103,377

(22) Filed: Jun. 24, 1998

(30) Foreign Application Priority Data

Jun. 24, 1997 (JP) .................................................. 9-167671

(51) Int. Cl.[7] ..................................................... B60K 17/02
(52) U.S. Cl. .......................................... 180/383; 464/173
(58) Field of Search ..................................... 180/383, 384, 180/385; 464/173, 177, 175, 158; 277/634, 636, 585, 912; 403/50, 359

(56) References Cited

U.S. PATENT DOCUMENTS

| | | | |
|---|---|---|---|
| 4,224,808 | * 9/1980 | Gehrke | 64/32 F |
| 4,778,026 | * 10/1988 | Uchida et al. | 180/297 |
| 5,098,344 | * 3/1992 | Zollinger | 464/175 |
| 5,183,351 | * 2/1993 | Schneider | 403/50 |
| 5,911,286 | * 6/1999 | Boutin | 180/359 |

FOREIGN PATENT DOCUMENTS 63-277208    6/1988 (JP) .

* cited by examiner

*Primary Examiner*—Paul N. Dickson
*Assistant Examiner*—Faye M. Fleming
(74) *Attorney, Agent, or Firm*—Birch, Stewart, Kolasch & Birch, LLP

(57) ABSTRACT

In a four wheel drive type buggy, an output shaft of an engine is connected to a front wheel propeller shaft and a bevel gear of a front wheel differential gear via a connecting pipe. The front wheel propeller shaft is provided with a large diameter section around an outer periphery surface thereof near and behind a rear end opening of the connecting pipe. A dust cover covers the outer periphery between the large diameter section and the rear end opening and a band fastens both ends of the cover. The large diameter section has approximately the same diameter as the outer diameter of a spline section formed at the tip of the front wheel propeller shaft. When connecting the front wheel propeller shaft to the connecting pipe, the spline section is insertable into the free opening of the dust cover, with the dust cover previously covering the outer periphery surface of the rear end opening. When the splines are engaged, the free side of the dust cover covers the outer periphery of the large diameter section and the band securely fastens the cover.

19 Claims, 6 Drawing Sheets

DUST COVER STRUCTURE FOR A POWER TRANSMISSION MEMBER

BACKGROUND OF THE INVENTION

1. Field of the Invention

The present invention relates to a dust cover structure for a power transmission member. The dust cover structure of the present invention is preferably used for a front wheel side propeller shaft of a four wheel drive vehicle, such as a buggy.

2. Description of Background Art

Japanese Patent Publication No. Sho 63-27208 discloses a power transmission structure of a four wheel drive vehicle which includes a generally conical rubber boot attached between large and small diameter power transmission shafts which form a constant velocity joint section.

When a large diameter spline section is formed at the end of the power transmission shaft and is used for connection, it is necessary to seal the joint with sealing material. Since a fastening allowance of the sealing material constantly varies because of vibration of the transmission shaft, especially at the axle side thereof, it is desired to provide more secured sealing. Accordingly, use of the above-mentioned boot type dust cover has been considered. However, because of the need to pass through the large diameter spline section, one end of the dust cover must first be connected to the small diameter side of the power transmission shaft before attaching a large diameter opening of the boot to the large diameter side of the power transmission shaft. This renders the attachment of the dust cover difficult. Therefore, an easier way of assembling the dust cover would be preferable.

SUMMARY OF THE INVENTION

In order to solve the above problem, a dust cover structure according to the present invention includes a power transmission member for transmitting output power of an engine to an axle side, with a large diameter spline section formed at one end thereof being fitted with splines of a tubular joint section placed on the axle side. The power transmission member is accommodated inside a cover member and the dust cover structure includes a generally tubular dust cover for covering the outer periphery between a large diameter section of the power transmission member having approximately the same diameter of the spline section and the tubular joint section.

The dust cover attaching structure can be incorporated into a saddle-ridden vehicle, and can also be incorporated into a front wheel side propeller shaft of a front wheel drive vehicle.

The dust cover structure of the present invention includes both the spline section formed at the end of the power transmission member and a large diameter section having approximately the same diameter as the spline section. In assembly, even if the dust cover is previously attached to the outer periphery of an open end of the tubular joint section, it is still possible to connect the power transmission member by inserting both ends of the member into the dust cover so as to fit with the spline section formed thereon.

Unlike the known conical boot, it is unnecessary to attach the dust cover to the generally small diameter section of the power transmission member beforehand. This eliminates the cumbersome assembling task of the large diameter side or the tubular joint side, which had to be carried out within a relatively limited space, and simplifies the entire dust cover assembling process.

In addition, the provision of the dust cover significantly improves the sealing reliability. This is particularly preferable for the saddle-ridden vehicle which requires a highly secured sealing, such as a four wheel buggy for running on rough land.

The dust cover of the present invention is particularly effective when incorporated into the front wheel side propeller shaft of a four wheel drive vehicle in which the dust cover is attached at both ends of the propeller shaft.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

The present invention will now be described in detail with reference to the attached drawings.

Figure 3:
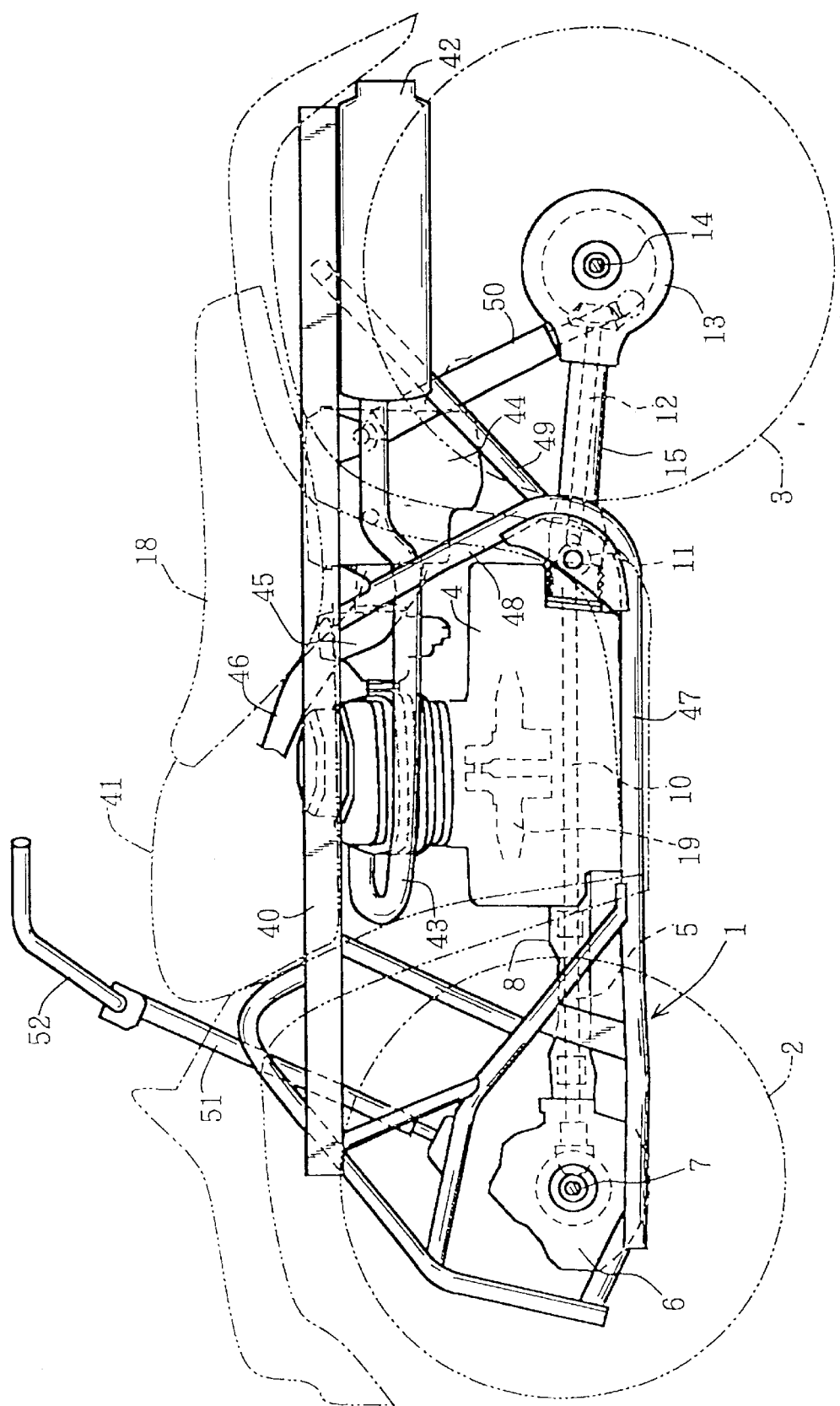
FIG. 3 is a side view of a four wheel buggy incorporating the present invention.
Figure 4:
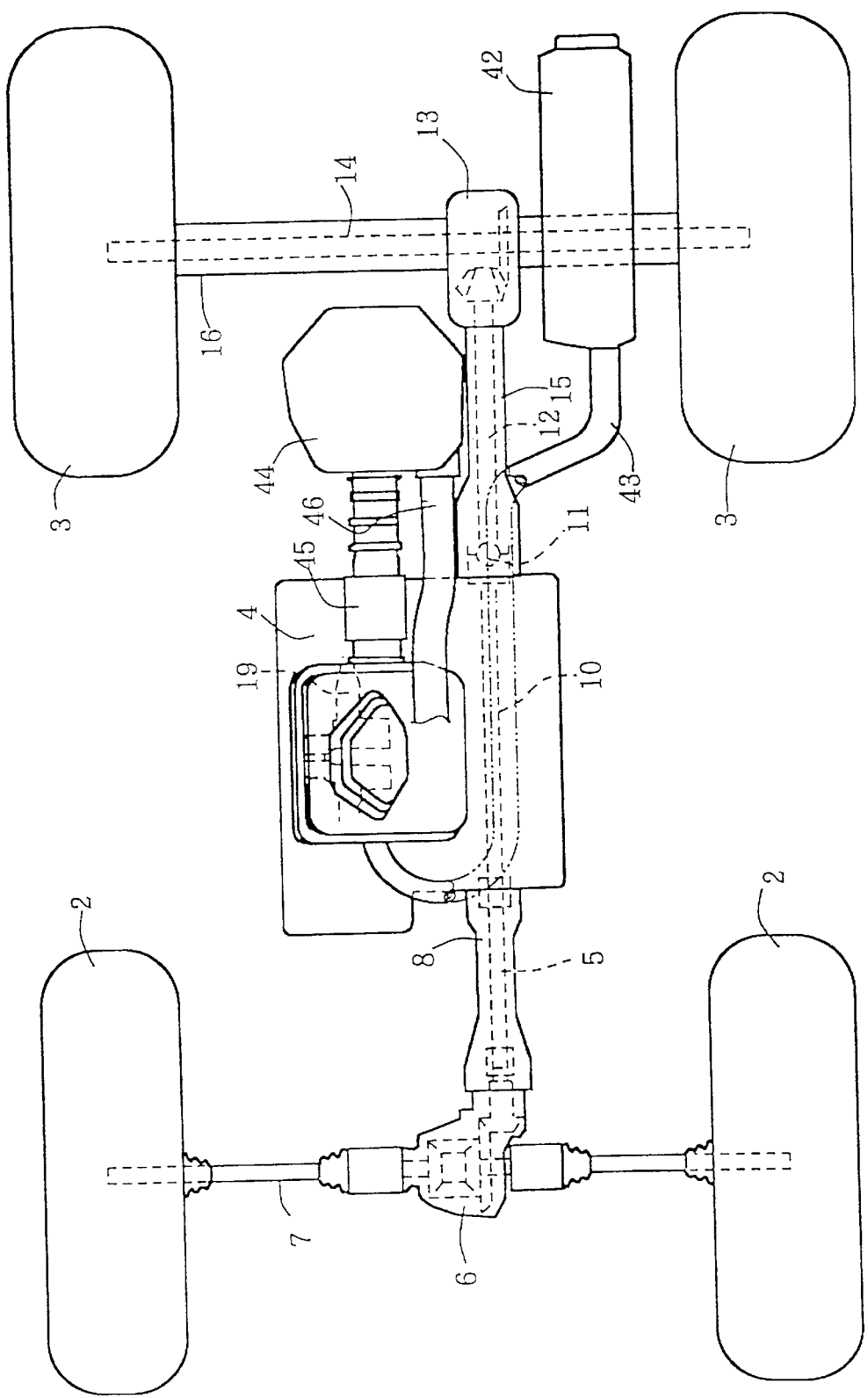
FIG. 4 is a schematic view illustrating the power transmission system of the buggy.

Referring to FIGS. 3 and 4, a four wheel buggy, typically a four wheel drive vehicle suitable for running on rough land, includes a pair of front wheels 2 and a pair of rear wheels 3 supported in the front and back of a body frame 1. Each pair of wheels includes a pair of right and left low pressure balloon tires. The vehicle is driven by an engine 4 disposed in the center of the body.

The power transmission system of the front wheels includes a front wheel propeller shaft 5 extending forward from the engine 4, a front wheel differential gear 6 connected to the front end of the propeller shaft 5, and a front wheel axle 7 extending to right and left sides of the front wheel differential gear 6. The front wheel propeller shaft 5 is covered by a propeller shaft cover 8.

The power transmission system of the rear wheel includes a rear wheel propeller shaft 12 connected to the rear end of an output shaft 10 of the engine 4 via a universal joint 11 and extending backwardly therefrom. A rear wheel gear box 13 is connected to the rear end of the propeller shaft 12, and a rear wheel axle 14 extends to right and left sides of the rear wheel gear box 13.

The rear wheel propeller shaft 12 is cased in a mantle tube 15 which is s attached by an axis to the body frame 1 at the front end thereof and is connected to the rear wheel gear box 13 at the rear end thereof. This mantle tube 15 provides a rear swing arm for the rear wheel suspension.

The rear wheel axle 14 runs in a mantle tube 16 extending to the right and left sides of the rear wheel gear box 13, and a buffer or shock absorber is provided at a joint of the mantle tube 16 and the body frame 1.

A saddle-riding type seat 18 is placed near and behind the engine 4 above the center of the body frame 1, whereby a saddle-ridden vehicle similar to a motorcycle is provided.

Figure 5:
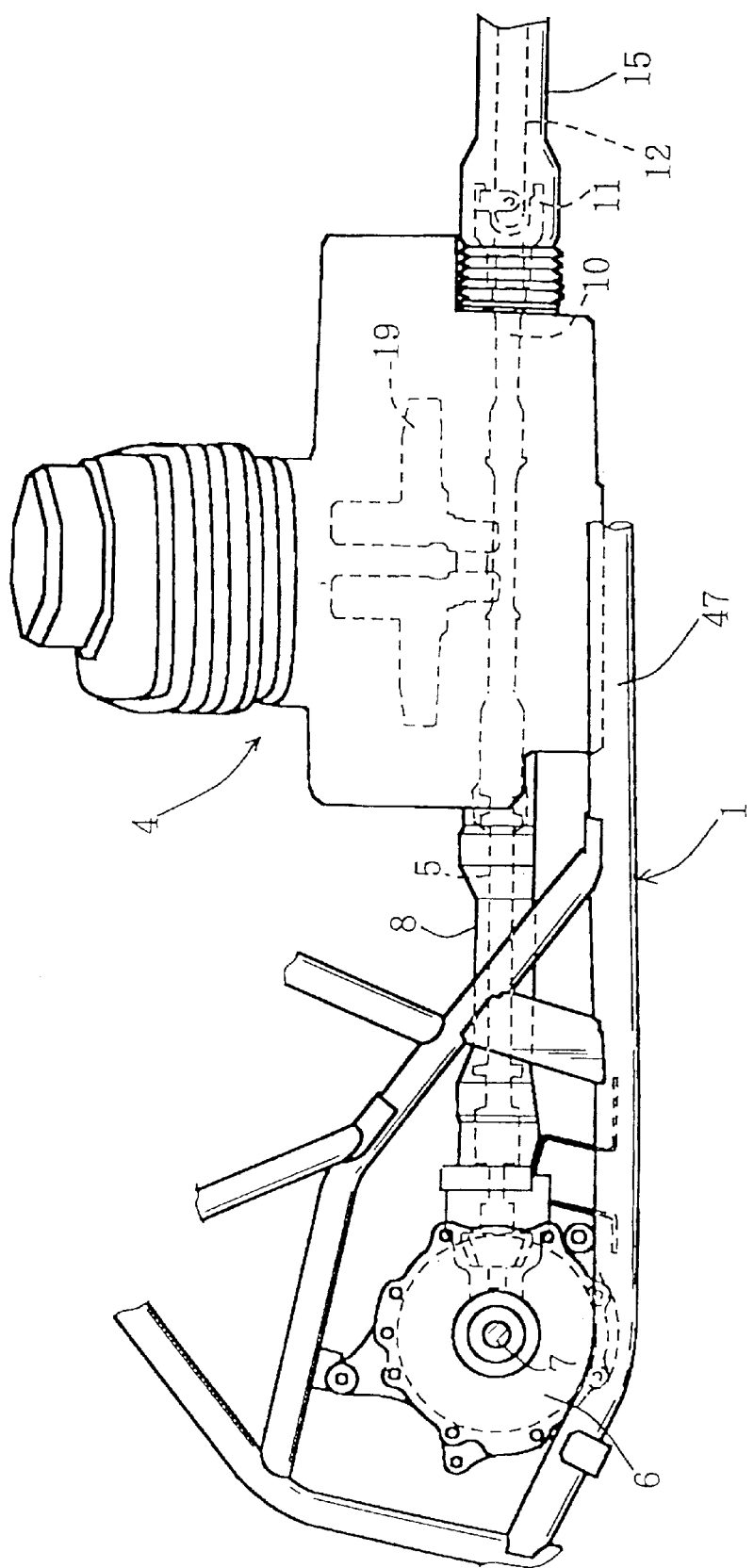
FIG. 5 is a side view of the front transmission system.

As shown in FIG. 5, a crank shaft 19 of the engine 4 is arranged along the longitudinal direction of the body. The output shaft 10 which receives power from inside the engine through a transmission mechanism (not shown) is arranged parallel to the crank shaft 19.

Figure 6:
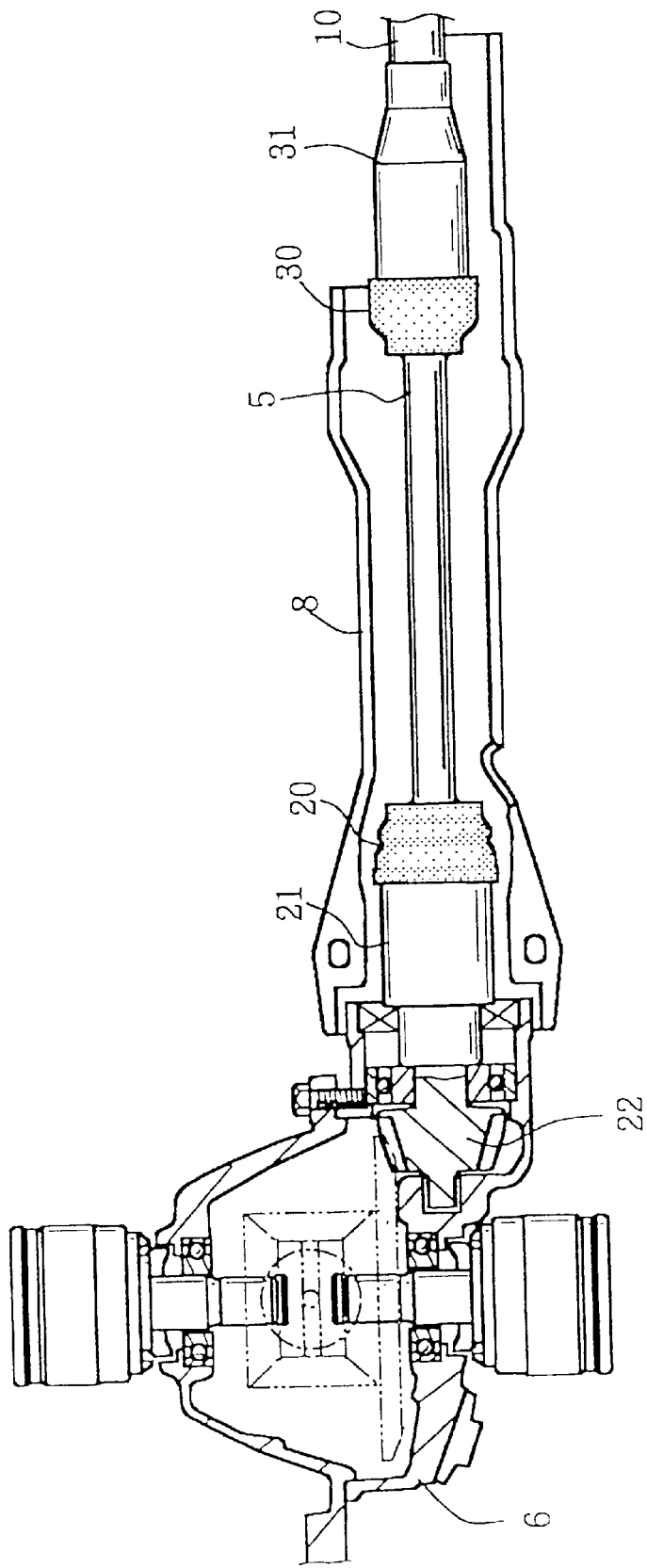
FIG. 6 is a plan view of the system shown in FIG. 5.

The front end of the output shaft 10 is connected to the front wheel propeller shaft 5. the front wheel propeller shaft 5 is housed in a propeller shaft cover 8 which is divided into upper and lower parts as shown in FIG. 6. The front wheel propeller shaft 5 placed inside the cover can be maneuvered from above, e.g., for the operation of connecting by removing the upper part of the cover.

The front end of the front wheel propeller shaft 5 is connected to the rear end of a connecting pipe 21 and is covered by a front dust cover 20. The connecting pipe 21 receives at the front end thereof the axis of a bevel gear 22.

The bevel gear 22 is a well-known gear device which transmits a rotational output of the output shaft 10 into the front wheel side differential gear 6 which, in turn, converts a direction of the received power by generally 90 degrees and differentially transmits the power to the transverse axle 7.

The rear end of the front wheel propeller shaft 5 is covered by a rear dust cover 30 and is connected to the front end of a connecting pipe 31 which is, in turn, connected to the front end of the output shaft 10 having splines thereon which will be described below.

Figure 1:
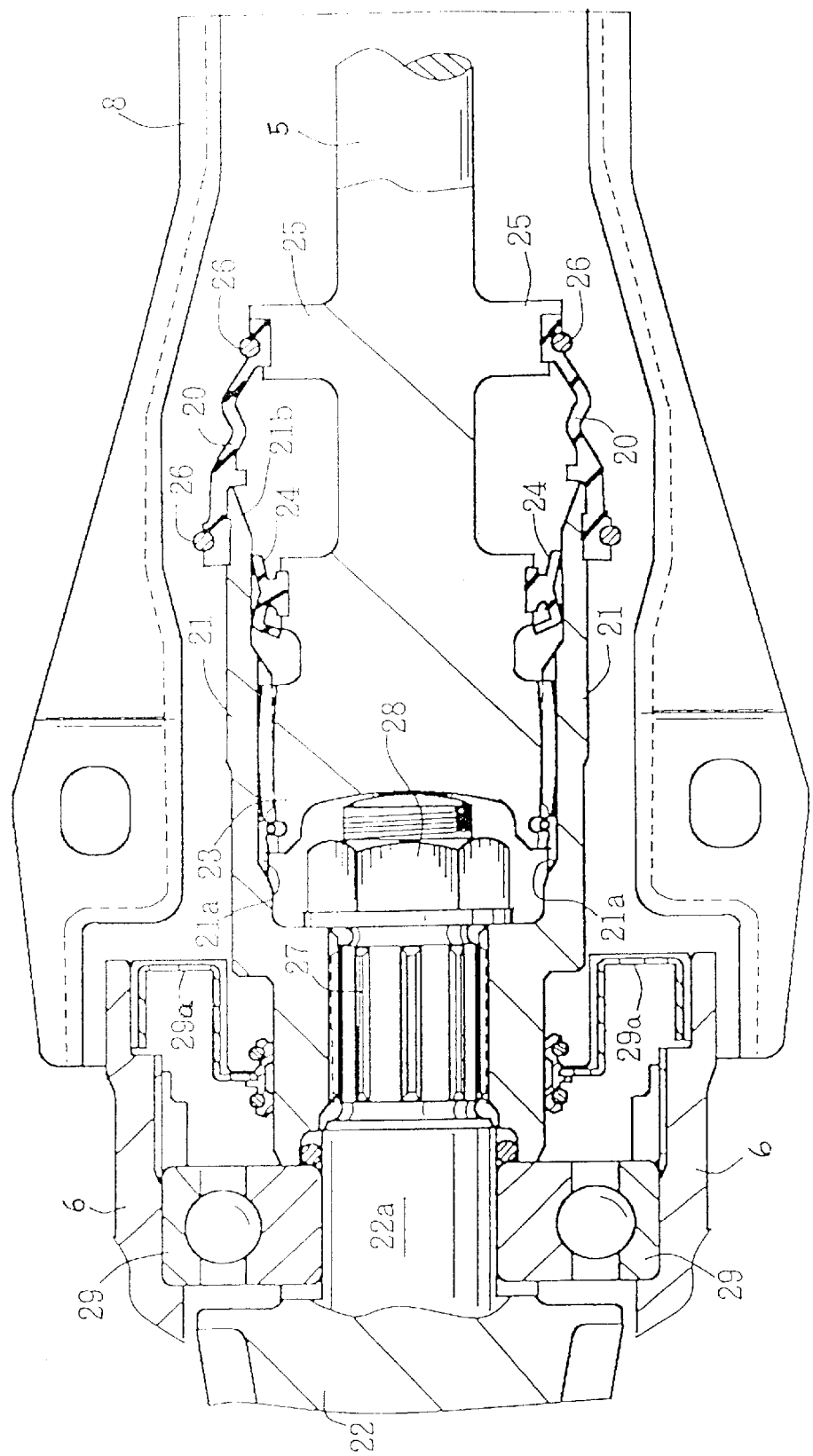
FIG. 1 is an enlarged sectional view illustrating a joint section on the axle side of a propeller shaft.

Referring now to FIG. 1, the joint section of the front end of the front wheel propeller shaft 5 and the connecting pipe 21 is illustrated in detail. As shown in the figure, the front end of the front wheel propeller shaft 5 has a spline section 23 which is inserted into the rear part of the tubular connecting pipe 21 The spline section 23 is fitted with splines 21a formed on an inner periphery of the connecting pipe 21. The spline section 23 also provides an axially curved surface.

At the interface between the spline-fitted part and a rear end opening 21b of the connecting pipe 21, a sealing member 24 provided on the front wheel propeller shaft 5 seals the interface between the front wheel propeller shaft 5 and the inner periphery surface of the connecting pipe 21.

A large diameter section 25 is formed on the outer periphery of the front wheel propeller shaft 5 close to and behind the rear end opening 21b. The large diameter section has approximately the same diameter as the outer diameter of the spline section 23 and extends in a direction perpendicular to the shaft. The dust cover 20 covers the outer periphery surface between the large diameter section 25 and the rear end opening 21b.

Openings on both sides of the dust cover 20 have approximately the same diameter as that of the rear end opening 21b and the large diameter section 25.

The dust cover 20 is made of a suitable resilient material, such as rubber, to cover the outer periphery surface between the large diameter section 25 and the rear end opening 21b, and is fastened securely at both ends with a band 26 to prevent water or dust from coming into the dust cover 20.

The connecting pipe 21 also includes on its front end side a front hole 21c having splines formed on the inner periphery, through which the axis 22a of the bevel gear 22 is inserted to engage a spline section 27 formed in the middle of the outer periphery of the axis 22a with the splines of the hole 21c. The axis 22a is fastened with the connecting pipe 21 by a nut 28.

A reference numeral 29 indicates a bearing which receives the axis 22a, and 29a indicates a sealing member which seals the connecting pipe 21 and the front wheel side differential gear 6.

Figure 2:
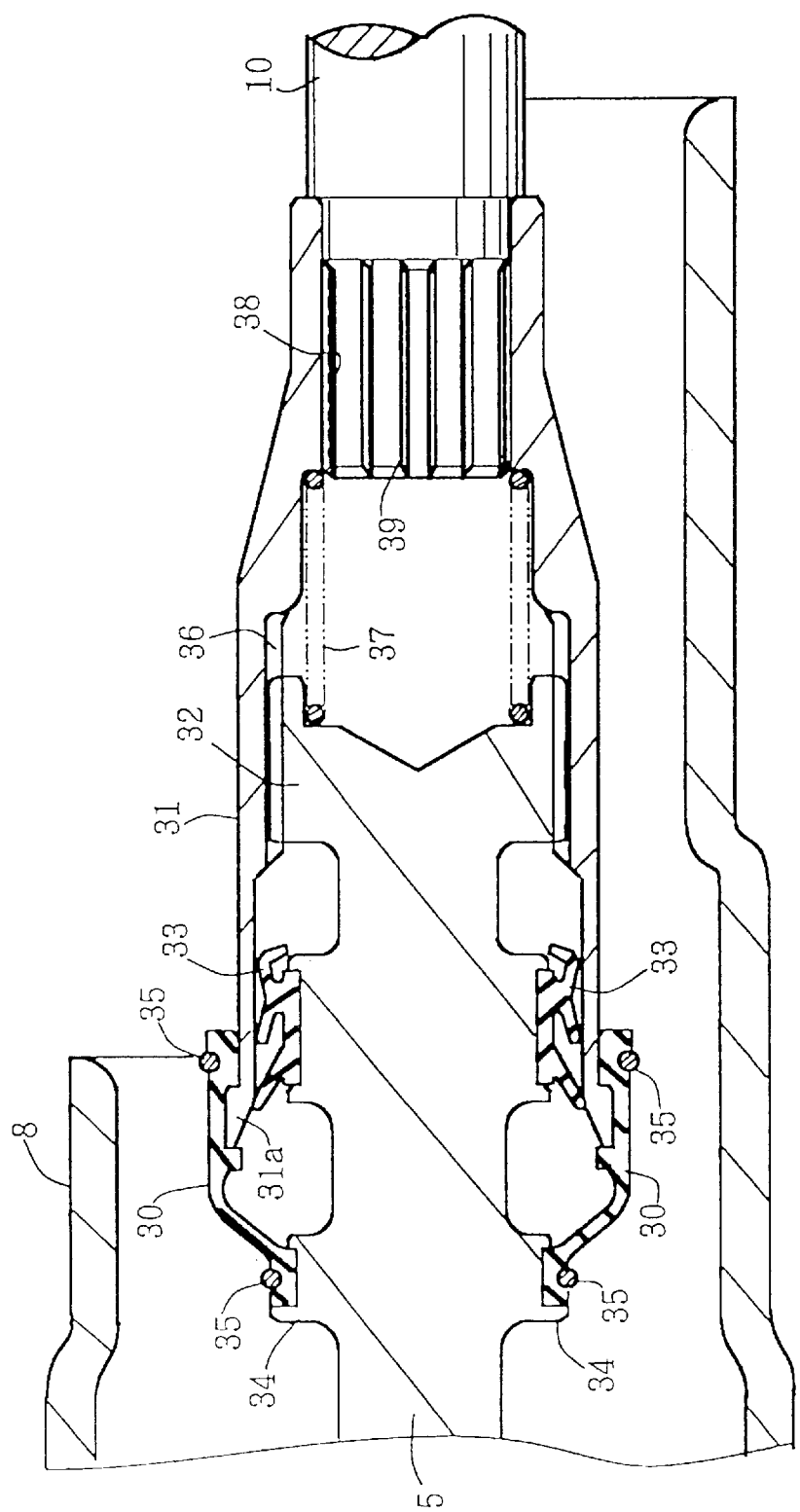
FIG. 2 is a similar view of FIG. 1 illustrating the engine side thereof.

Referring now to FIG. 2, the joint section of the rear end of the front wheel propeller shaft 5 and the connecting pipe 31 is shown in detail. As shown in the figure, the rear end of the front wheel propeller shaft 5 also has a spline section 32 inserted into the front side of the tubular connecting pipe 31 where the spline section is engaged with splines 36 formed on the inner periphery surface of the connecting pipe 31.

At the interface between the spline-fitted part and a front end opening 31a of the connecting pipe 31, a sealing member 33 provided on the front wheel propeller shaft 5 side seals the interface between the front wheel propeller shaft 5 and the inner periphery surface of the connecting pipe 31.

A large diameter section 34 is formed on the outer periphery of the front wheel propeller shaft 5 close to and in front of the front end opening 31a. The large diameter section has approximately the same diameter as an outer diameter of the spline section 32 and extends in a direction perpendicular to the shaft. The dust cover 30 covers the outer periphery surface between the large diameter section 34 and the front end opening 31a.

The dust cover 30 is made of a material similar to the material used in the above described dust cover 20 to cover the outer periphery surface between the large diameter section 34 and the front end opening 3 la, and is fastened securely at both ends with a band 35 to thereby prevent water or dust from coming into the dust cover 30.

Openings on both sides of the dust cover 30 have approximately the same diameter as that of the front end opening 31a and the large diameter section 34.

The spline section 32 of the front wheel propeller shaft 5 is movably fitted with splines 36 in an axial direction so that the shaft can be moved toward the front wheel differential gear 6 side by a spring 37.

The connecting pipe 31 also includes on its rear end side a rear hole 38 which has splines formed on the inner periphery, through which the output shaft 10 is inserted to fit a spline section 39 formed at the front end thereof with the splines of the hole 38.

In FIG. 3, reference numeral 40 indicates an upper frame made of an angular pipe for forming part of the body frame 1, the upper frame being provided in a transverse pair and mounted in parallel in a longitudinal direction of the body. A fuel tank 41 and the seat 18 are supported on the upper frame and a muffler 42 is attached below the left rear end thereof. An exhaust tube 43 connected to the muffler 42 extends in a longitudinal direction of the body to run above the crank case of the engine 4 to reach an exhaust outlet from the front side of the cylinder section. 44 indicates an air cleaner, 45 indicates-a carburetor, and 46 indicates a snorkel-like inlet guiding tube of the air cleaner.

Similarly, reference numeral 47 indicates a lower frame made of a round pipe for forming part of the body frame 1 and supporting the engine 4. The lower frame is provided in a transverse pair and extends in a longitudinal direction of the body. A rear part 48 of the lower frame is bent upward so as to be connected to the upper frame 40. Reference numeral 49 indicates a rear stay, 50 indicates a buffer of shock absorber, 51 indicates a handle post, and 52 indicates a handle bar.

In operation, in order to connect the front wheel propeller shaft 5 to the engine 4 and the front wheel side differential gear 6, the upper part of the propeller shaft cover 8 is first removed and then the front wheel propeller shaft 5 is connected to the engine 4.

Referring to FIG. 2 again, the front end of the output shaft 10 is connected to the rear end side of the connecting pipe 31 by fitting the spline section 39 of the output shaft with the hole 38 of the connecting pipe. The outer periphery surface of the front end opening 31a has previously been covered by one end of the dust cover 30 and is securely fastened with the band 35.

Since the spline section 32 of the front wheel propeller shaft 5 has approximately the same diameter as that of the free opening of the dust cover 30, the spline section 32 can easily pass through the opening and fit with the splines 36 to thereby connect to the connecting pipe 31. The outer periphery surface of the large diameter section 34 is then covered by the free end of the dust cover 30 and is securely fastened with the band 35.

After connecting to the output shaft 10, the front wheel propeller shaft 5 is connected at its front end side to the front wheel side differential gear 6. Referring to FIG. 1, before the bevel gear 22 is connected to the front wheel propeller shaft 5, the outer periphery surface of the rear end opening 21b of the connecting pipe 21 is covered by one end of the dust cover 20 and is securely fastened with the band 26. The connecting pipe 21, which is now integral with the front wheel side differential gear 6 via the bevel gear 22 attached thereto, is inserted into the front end side of the propeller shaft cover 8 and is connected to the front wheel propeller shaft 5 by fitting the rear end of the connecting pipe with the spline section 23 of the front wheel propeller shaft.

Since the free opening of the dust cover 20 has approximately the same diameter as that of the spline section 23, it can easily pass through the opening. The outer periphery surface of the large diameter section 25 is covered with the free opening of the dust cover 20 and is securely fastened with the band 26. Thus, the attachment of the dust cover 20 is completed.

As described above, the front wheel propeller shaft 5 includes the large diameter sections 25 and 34 at both ends thereof, which have approximately the same diameter as the spline sections 23 and 32. Therefore, during assembly, if the dust covers 20 and 30 have previously been attached around the outer periphery of respective openings of the connecting pipes 21 and 31, it is still possible to insert the spline sections 23 and 32 formed at both ends of the front wheel propeller shaft 5 into the dust covers 20 and 30.

Unlike the known conical boot, the dust cover of the present invention does not require the front wheel propeller shaft 5 to be previously attached to the small diameter section. This eliminates the difficult attaching task of the connecting pipes 21 and 31 having a large diameter, which were carried out inside the propeller shaft cover 8, and facilitates the entire assembling process of the dust covers 20 and 30. Furthermore, the dust covers 20 and 30 are advantageous since they act as a double sealing with the conventional sealing 24 and 33 for further ensuring that sealing is reliable. This is particularly preferable for four wheel buggies which run on rough land and require more secure sealing.

The dust cover of the present invention is advantageously incorporated into the front wheel side propeller shaft of a four wheel drive vehicle in which the dust covers 20 and 30 are attached at both ends of the propeller shaft.

We claim:

1. A power transmission member for transmitting output power of an engine to an axle comprising:

a shaft having first and second ends;

a large diameter spline section formed on said first end of said shaft for engaging with splines of a tubular joint section, said shaft adapted to be accommodated inside a cover member;

a large diameter portion formed on said shaft adjacent to said large diameter spline section; and a generally tubular dust cover for covering an outer periphery between said large diameter portion of said shaft and the tubular joint section, said dust cover including a first end having generally the same diameter as said large diameter spline section and a second end having generally the same diameter as the tubular joint section.

2. The power transmission member according to claim 1, wherein said shaft is a front wheel propeller shaft for a front wheel drive vehicle for transmitting power from the engine to front wheels supported on the axle of the vehicle.

3. The power transmission member for transmitting output power of an engine to an axle according to claim 1, wherein a sealing member for sealing between the tubular joint section and said shaft is located between said large diameter spline section and said large diameter portion.

4. The power transmission member for transmitting output power of an engine to an axle according to claim 1, wherein first and second bands are provided for securing said dust cover to said large diameter portion and the tubular joint section, respectively.

5. The power transmission member for transmitting output power of an engine to an axle according to claim 1, further comprising:

a large diameter spline section formed on said second end of said shaft for engaging with splines of a second tubular joint section;

a large diameter portion formed on said shaft adjacent to said large diameter spline section on said second end of said shaft; and a generally tubular dust cover for covering an outer periphery between said large diameter portion on said second end of said shaft and the second tubular joint section, said dust cover including a first end having generally the same diameter as said large diameter spline section on said second end of said shaft and a second end having generally the same diameter as the second tubular joint section.

6. The power transmission member for transmitting output power of an engine to an axle according to claim 5, wherein a first sealing member for sealing between the tubular joint section and said shaft is located between said large diameter spline section and said large diameter portion on said first end of said shaft and a second sealing member for sealing between the second tubular joint section and said shaft is located between said large diameter spline section and said large diameter portion on said second end of said shaft.

7. The power transmission member for transmitting output power of an engine to an axle according to claim 5, wherein bands are provided for securing each of said dust covers to said large diameter portions and tubular joint sections on said first and second ends, respectively.

8. A vehicle comprising:
an engine having an output shaft;
an axle for supporting wheels of said vehicle; and
a power transmission member for transmitting output power of said engine to said axle, said power transmission member comprising:
   a shaft having first and second ends;
   a large diameter spline section formed on said first end of said shaft;
   a tubular joint section having splines for engaging with said splines of said large diameter spline section;
   a large diameter portion formed on said shaft adjacent to said large diameter spline section; and
   a generally tubular dust cover extending between said large diameter portion of said shaft and said tubular joint section, said dust cover including a first end having generally the same diameter as said large diameter spline section and a second end having generally the same diameter as said tubular joint section.

9. The vehicle according to claim 8, wherein said shaft is a front wheel propeller shaft for a front wheel drive vehicle for transmitting power from said engine to front wheels supported on said axle of said vehicle.

10. The vehicle according to claim 8, wherein a sealing member for sealing between said tubular joint section and said shaft is located between said large diameter spline section and said large diameter portion.

11. The vehicle according to claim 8, wherein first and second bands are provided for securing said dust cover to said large diameter portion and said tubular joint section, respectively.

12. The vehicle according to claim 8, further comprising:
a large diameter spline section formed on said second end of said shaft;
a second tubular joint section having splines for engaging with said splines of said large diameter spline section formed on said second end of said shaft;
a large diameter portion formed on said shaft adjacent to said large diameter spline section on said second end of said shaft; and
a generally tubular dust cover for covering an outer periphery between said large diameter portion on said second end of said shaft and said second tubular joint section, said dust cover including a first end having generally the same diameter as said large diameter spline section on said second end of said shaft and a second end having generally the same diameter as said second tubular joint section.

13. The vehicle according to claim 12, wherein a first sealing member for sealing between said tubular joint section and said shaft is located between said large diameter spline section and said large diameter portion on said first end of said shaft and a second sealing member for sealing between said second tubular joint section and said shaft is located between said large diameter spline section and said large diameter portion on said second end of said shaft.

14. The vehicle according to claim 13, wherein bands are provided for securing each of said dust covers to respective of said large diameter portions and said tubular joint sections.

15. The vehicle according to claim 8, wherein said tubular joint section includes first and second open ends, each of said open ends having splines on an inside surface thereof, said splines in said first open end for engaging with said large diameter spline section, said splines in said second open end for engaging with splines formed on a gear, said gear being operatively connected to said axle.

16. The vehicle according to claim 8, further comprising a cover member for covering said shaft and said tubular joint section.

17. A power transmission for transmitting output power of an engine to an axle of a vehicle comprising:
a shaft having first and second ends;
a first large diameter spline section formed on said first end of said shaft and a second large diameter spline section formed on said second end of said shaft;
first and second tubular joint sections having splines for engaging with said large diameter spline sections on said first and second ends, respectively, said first tubular joint section for transferring motion from the engine to said first end of said shaft and said second tubular joint section for transferring motion from said shaft to the axle of the vehicle;
first and second large diameter portions formed on said shaft adjacent to said large diameter spline sections on said first and second ends of said shaft, respectively; and
first and second generally tubular dust covers extending between said first and second large diameter portions of said shaft and said first and second tubular joint sections on said first and second ends, respectively, each of said first and second dust covers including a first end having generally the same diameter as said large diameter spline sections on said first and second ends, respectively and a second end having generally the same diameter as said tubular joint sections on said first and second ends, respectively.

18. The power transmission for transmitting output power of an engine to an axle of a vehicle according to claim 17, wherein said shaft is a front wheel propeller shaft for a front wheel drive vehicle for transmitting power from the engine to front wheels supported on the axle of the vehicle.

19. The power transmission for transmitting output power of an engine to an axle of a vehicle according to claim 17, wherein each of said first and second tubular joint sections include first and second open ends, each of said open ends having splines on an inside surface thereof, said splines in said first open end for engaging with a respective of said large diameter spline sections, said splines in said second open end of said first tubular joint section for engaging with splines on an output shaft of the engine, said splines in said second end of said second tubular joint section for engaging with splines formed on a gear, said gear being operatively connected to said axle.

* * * * *